United States Patent [19]
Thorogood et al.

[11] Patent Number: 5,240,480
[45] Date of Patent: Aug. 31, 1993

[54] COMPOSITE MIXED CONDUCTOR MEMBRANES FOR PRODUCING OXYGEN

[75] Inventors: Robert M. Thorogood, Macungie; Rajagopalan Srinivasan, Allentown; Terrence F. Yee, Macungie; Miles P. Drake, Allentown, all of Pa.

[73] Assignee: Air Products and Chemicals, Inc., Allentown, Pa.

[21] Appl. No.: 945,320

[22] Filed: Sep. 15, 1992

[51] Int. Cl.$^5$ .................. B01D 53/22; B01D 71/02
[52] U.S. Cl. ................................. 96/4; 55/524; 505/1; 505/701; 505/778; 505/785; 95/54
[58] Field of Search ............ 55/16, 68, 158, 524; 505/1, 700, 701, 778, 785, 809

[56] References Cited

U.S. PATENT DOCUMENTS

| | | | |
|---|---|---|---|
| 3,241,298 | 3/1966 | Pierce | 55/16 X |
| 4,151,060 | 4/1979 | Isenberg | 55/16 X |
| 4,728,346 | 3/1988 | Murphy | 55/16 X |
| 4,838,904 | 6/1989 | Sanders, Jr. et al. | 55/16 X |
| 4,865,630 | 9/1989 | Abe | 55/158 |
| 4,981,676 | 1/1991 | Minet et al. | 55/16 X |
| 5,035,726 | 7/1991 | Chen et al. | 55/16 |
| 5,035,727 | 7/1991 | Chen | 55/16 |
| 5,108,465 | 4/1992 | Bauer et al. | 55/16 |
| 5,160,713 | 11/1992 | Mazanec et al. | 55/16 X |
| 5,162,301 | 11/1992 | Reich et al. | 55/16 X |
| 5,169,415 | 12/1992 | Roettger et al. | 55/16 X |

FOREIGN PATENT DOCUMENTS

| | | | |
|---|---|---|---|
| 0362898 | 4/1990 | European Pat. Off. | 55/16 |
| 0458217 | 11/1991 | European Pat. Off. | 55/16 |
| 3719118 | 12/1988 | Fed. Rep. of Germany | 55/158 |
| 56-092103 | 7/1981 | Japan | 55/16 |
| 60-044003 | 3/1985 | Japan | 55/158 |
| 60-248215 | 12/1985 | Japan | 55/158 |
| 61-002548 | 1/1986 | Japan | 55/158 |
| 61-209005 | 9/1986 | Japan | 55/158 |
| 63-156515 | 6/1988 | Japan | 55/158 |
| 63-156516 | 6/1988 | Japan | 55/158 |

*Primary Examiner*—Robert Spitzer
*Attorney, Agent, or Firm*—Keith D. Gourley; James C. Simmons; William F. Marsh

[57] ABSTRACT

The present invention relates to novel multi-layer composite solid state membranes which are capable of separating oxygen from oxygen-containing gaseous mixtures at elevated temperatures. The membranes comprise a multicomponent metallic oxide porous layer having an average pore radius of less than about 10 micrometers and a multicomponent metallic oxide dense layer having no connected through porosity wherein the porous and dense layers are contiguous and such layers conduct electrons and oxygen ions at operating temperatures.

36 Claims, 3 Drawing Sheets

COMPOSITE MIXED CONDUCTOR MEMBRANES FOR PRODUCING OXYGEN

TECHNICAL FIELD OF THE INVENTION

The present invention relates to novel multi-layer composite membranes formed from mixed conducting oxides which are capable of separating oxygen from oxygen-containing gaseous mixtures at elevated temperatures. The membranes possess a composite structure comprising a dense layer and one or more porous layers formed from one or more mixed conducting multicomponent metallic oxides, which layers are oriented such that enhanced oxygen flux is observed compared to prior art membranes formed from mixed conducting oxides.

BACKGROUND OF THE INVENTION

Solid state membranes formed from oxygen ion conducting materials are beginning to show promise for use in commercial processes for separating oxygen from oxygen-containing streams. Envisioned applications range from small scale oxygen pumps for medical use to large scale integrated gasification combined cycle (IGCC) plants. This technology encompasses two distinctly different membrane materials, solid electrolytes and mixed conductors. Membranes formed from mixed conductors are preferred over solid electrolytes in processes for separating oxygen from oxygen-containing gaseous mixtures because mixed conductors conduct both oxygen ions and electrons and can be operated without external circuitry such as electrodes, interconnects and power-supplies. In contrast, solid electrolytes conduct only oxygen ions.

Membranes formed from solid electrolytes and mixed conducting oxides are oxygen selective and can transport oxygen ions through dynamically formed oxygen anion vacancies in the solid lattice when operated at temperatures typically above about 700° C. Examples of solid electrolytes include yttria-stabilized zirconia (YSZ) and bismuth oxide. Examples of mixed conductors include titania-doped YSZ, praseodymia-modified YSZ, and, more importantly, various mixed metal oxides some of which possess the Perovskite structure. Japanese Patent Application No. 61-21717 discloses membranes formed from multicomponent metallic oxides having the Perovskite structure represented by the formula $La_{1-x}Sr_xCo_{1-y}Fe_yO_{3-d}$ wherein x ranges from 0.1 to 1.0, y ranges from 0.05 to 1.0 and d ranges from 0.5 to 0.

Membranes formed from mixed conducting oxides which are operated at elevated temperatures can be used to selectively separate oxygen from an oxygen-containing gaseous mixture when a difference in oxygen partial pressures exist on opposite sides of the membrane. Oxygen transport occurs as molecular oxygen is dissociated into oxygen ions which ions migrate to the low pressure side of the membrane where the ions recombine to form oxygen molecules, and electrons migrate through the membrane in a direction opposite the oxygen ions to conserve charge. The rate at which oxygen permeates through the membrane is mainly controlled by two factors, the diffusion rate within the membrane and the kinetic rate of interfacial oxygen exchange; i.e., the rate at which oxygen molecules in the feed gas are converted to mobile oxygen ions at the surface of the feed side of the membrane and back again to oxygen molecules on the permeate side of the membrane.

Membranes formed from mixed conducting oxides offer substantially superior oxygen selectivity than polymeric membranes. However, the value of such improved selectivity must be weighed against the higher costs associated with building and operating plants employing membranes formed from mixed conducting oxides which plants require heat exchangers, high temperature seals and other costly equipment. Typical prior art membranes formed from mixed conducting oxides do not exhibit sufficient oxygen permeance (defined as a ratio of permeability to thickness) to justify their use in commercial gas separation applications.

Oxygen permeance through solid state membranes is known to increase proportionally with decreasing membrane thickness until the membrane thickness approaches about 0.5 mm. Many steps are involved in converting molecular oxygen to mobile oxygen ions, which oxygen ions are transported through the solid state membrane and converted back to molecular oxygen on the opposite side of the membrane. Each of these steps contributes to impede transfer of oxygen through thin solid state membranes, particularly those having a thickness less than about 0.5 mm.

Teraoka and coworkers, J. Ceram. Soc. Japan. International Ed, Vol 97, pp 458–462, (1989) and J. Ceram. Soc. Japan. International Ed, Vol 97, pp 523–529, (1989) describe solid state gas separation membranes formed by depositing a dense, nonporous mixed conducting oxide layer, referred to as "the dense layer", onto a porous mixed conducting support. The relatively thick porous mixed conducting support provides mechanical stability for the thin, relatively fragile dense, nonporous mixed conducting layer. Structural failures due to thermo-mechanical stresses experienced by the membranes during fabrication and use were substantially minimized due to the chemical compatibility of the respective membrane layers. Based upon considerations limited to dense layer thickness, Teraoka and coworkers expected the oxygen flux to increase by a factor of 10 for a membrane having a mixed conducting porous layer and a thin mixed conducting dense layer compared to a standard single layered dense, sintered mixed conducting disc. However, they obtained an increase of less than a factor of two.

Researchers are continuing their search for thin, supported solid state ionically conductive membranes which exhibit superior oxygen flux without sacrificing mechanical and physical compatibility of the composite membrane.

BRIEF SUMMARY OF THE INVENTION

The present invention relates to novel multi-layer composite mixed conducting membranes which are capable of separating oxygen from oxygen-containing gaseous mixtures at elevated temperatures. The membranes have a composite structure comprising a dense layer of specified mixed conducting oxides and one or more porous layers of such specified mixed conducting oxides oriented such that enhanced oxygen flux is observed compared to prior art solid state membranes.

While membranes are known which comprise a dense mixed conducting oxide layer which is deposited onto a mixed conducting oxide porous support in which the porous support does not play an active role in increasing oxygen flux, the membranes of the present invention are formed from a dense mixed conducting oxide layer and one or more porous mixed conducting oxide layers having substantially reduced average pore diameter compared to prior art membranes. The layers of the present invention are oriented such that kinetic limitations associated with oxygen transport are dramatically reduced and oxygen flux is substantially improved.

More particularly, the membranes of the present invention comprise one or more multicomponent metallic oxide porous layers having an average pore radius of less than about 10 micrometers and a multicomponent metallic oxide dense layer having no connected through porosity wherein the porous and dense layers are contiguous and such layers conduct electrons and oxygen ions at operating temperatures. The general embodiment includes composite membranes having a plurality of contiguous porous multicomponent metallic oxide layers wherein the average pore radius of each respective porous layer increases with distance away from the dense layer. Preferably, a number of porous layers are used, typically in excess of 5, wherein the average pore radius of each respective layer gradually increases as a function of distance away from the dense layer, with no limit on the maximum average pore radius. Porous layers which are not contiguous with the dense multicomponent metallic oxide layer may be formed of an "inert" material which does not conduct electrons or oxygen ions at membrane operating temperatures.

In a second embodiment, the composite membranes comprise a dense multicomponent metallic oxide layer which is sandwiched between a plurality of porous multicomponent metallic oxide layers. Preferably, the porous layers adjacent to both sides of the dense mixed conducting oxide layer have an average pore radius of less than about 10 micrometers.

The porous and dense layers of the membranes according to the first and second embodiments are formed from one or a mixture of two or more multicomponent metallic oxides comprising an oxide of at least two different metals or a mixture of at least two different metal oxides wherein the multicomponent metallic oxide demonstrates electron conductivity as well as oxygen ion conductivity at temperatures greater than about 500° C. Hence, these materials are commonly referred to as mixed conducting oxides.

Suitable mixed conducting oxides are represented by the structure $A_x A'_{x'} A''_{x''} B_y B'_{y'} B''_{y''} O_{3-z}$, where A,A',A" are chosen from the group comprising Groups 1, 2 and 3 and the F block lanthanides; and B,B',B" are chosen from the D block transition metals according to the Periodic Table of the Elements adopted by the IUPAC wherein $0 < x \leq 1$, $0 \leq x' \leq 1$, $0 \leq x'' \leq 1$, $0 < y \leq 1$, $0 \leq y' \leq 1$, $0 \leq y'' \leq 1$, $x + x' + x'' = 1$, $y + y' + y'' = 1$ and z is a number which renders the compound charge neutral. Preferably, A, A' or A" of the enumerated structure is a Group 2 metal selected from the group consisting of calcium, strontium, barium and magnesium. Preferred mixed conducting oxides which can be deposited are represented by the formula $La_x A_{1-x} Co_y Fe_{1-y} O_{3-z}$ wherein x is between 0 and 1, y is between 0 and 1 and A is selected from barium, strontium or calcium.

The membranes of the present invention can be used to recover oxygen from an oxygen-containing gaseous mixture by delivering the oxygen-containing gaseous mixture into a first gas compartment which is separated from a second gas compartment by the subject membrane, establishing a positive oxygen partial pressure difference between the first and second gas compartments by producing an excess oxygen partial pressure in the first gas compartment and/or by producing a reduced oxygen partial pressure in the second gas compartment; contacting the oxygen-containing gaseous mixture with the membrane at a temperature greater than about 500° C. to separate the oxygen-containing gaseous mixture into an oxygen permeate stream and an oxygen-depleted gaseous stream and recovering the oxygen permeate stream.

DETAILED DESCRIPTION OF THE INVENTION

The present invention relates to novel multi-layer composite mixed conducting membranes which are capable of separating oxygen from oxygen-containing gaseous mixtures at elevated temperatures. The composite membranes comprise at least one porous layer formed of one or more multicomponent metallic oxide and a dense layer formed of a multicomponent metallic oxide oriented such that enhanced oxygen flux is observed compared to prior art mixed conducting membranes.

Applicants have unexpectedly discovered that substantially improved oxygen fluxes and improved mechanical properties are obtained by constructing a multi-layer composite membrane wherein the porous mixed conducting layer of the composite membrane contiguous with the dense mixed conducting layer possesses pores having an average pore radius of less that about 10 micrometers. In contrast, the Teraoka references, discussed in the Background of the Invention, disclose composite membrane comprising a porous multicomponent metallic oxide layer having an average pore radius of greater than about 15 micrometers which is situated adjacent to a dense multicomponent metallic oxide layer. Applicants' innovation represents a divergence from the understanding held by those of ordinary skill in the relevant art.

One of ordinary skill in the art would expect that an adverse effect in mass transfer resistance would result upon decreasing the average pore radius of pores within a porous mixed conducting layer of a composite membrane. The prior art collectively teaches away from reducing the average pore radius of the porous multicomponent metallic oxide layer. Surprisingly, Applicants have discovered that composite membranes which demonstrate unexpectedly superior oxygen flux can be obtained by diverging from the collective teachings of the prior art by reducing the average pore radius of the pores in the porous mixed conducting oxide layers which are contiguous to the dense mixed conducting layer of a composite membrane. More particularly, unexpectedly superior flux values are obtained when the average pore radius of the pores within the subject porous layers are restricted to less than about 10 micrometers.

Applicants' discovery can be fully understood only by developing a understanding of the mechanism by which oxygen is ionically transported through the dense mixed conducting oxide layer of a composite membrane (hereinafter referred to as ion transport membranes or ITMs). The oxygen flux observed by conventional ITMs is controlled by "surface kinetic limitations" and "bulk diffusion limitations". Surface kinetic limitations are constraints to oxygen flux caused by one or more of the many steps involved in converting an oxygen molecule in the gas phase on the feed side of the ITM into mobile oxygen ions and converting the oxygen ions back to oxygen molecules on the permeate side of the ITM. Bulk diffusion limitations are constraints on oxygen flux relating to the diffusivity of oxygen ions through the dense mixed conducting oxide layer and the solid phase of the porous layer. Additional diffusion constraints can be associated with molecular oxygen moving through the pores of the porous layers.

Figure 1:
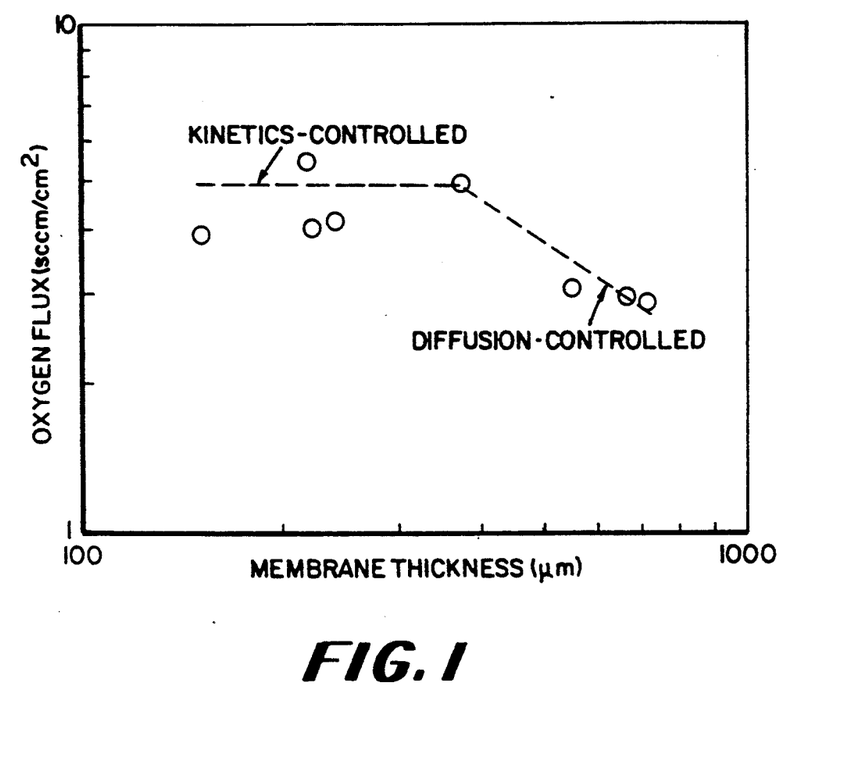
FIG. 1 graphically depicts the oxygen flux achieved by a composite membrane consisting of a dense layer of a mixed conducting oxide as a function of dense layer thickness and illustrates how oxygen flux is affected by surface kinetic limitations and bulk diffusion limitations.

FIG. 1 shows typical regimes in which the oxygen flux achieved by an ITM is limited by surface kinetic limitations and bulk diffusion limitations. The graph shows oxygen flux as a function of the thickness of a membrane consisting solely of a dense layer of a mixed conducting oxide. Oxygen flux achieved by a membrane comprising a relatively thick dense mixed conducting oxide layer is limited by the rate in which oxygen ions diffuse through the bulk of the dense layer. In contrast, oxygen flux achieved by a membrane consisting of a relatively thin dense mixed conducting oxide layer is limited by the rate in which molecular oxygen is converted to oxygen ions and converted back to molecular oxygen. Thus, oxygen flux achieved in membranes formed from a relatively thin mixed conducting dense layer is said to be surface-kinetically limited.

The present invention provides composite membranes which overcome kinetic limitations on oxygen flux associated with very thin dense mixed conducting oxide layers while providing membranes which maintain their structural integrity under the demanding high temperature conditions associated with processes using such membranes. The claimed membranes comprise a dense layer of one or more mixed conducting oxides having no connected through porosity and a porous layer of one or more mixed conducting oxides having an average pore radius of less than about 10 micrometers wherein the porous layer and the dense layer are contiguous and each layer is capable of conducting electrons and oxygen ions at operating temperatures.

The contiguous porous and dense layers of the present membranes are formed from one or more multicomponent metallic oxides comprising an oxide of at least two different metals or a mixture of at least two different metal oxides wherein the multicomponent metallic oxide demonstrates electron conductivity as well as oxygen ion conductivity at elevated temperatures. Multicomponent metallic oxides suitable for practicing the present invention are referred to as "mixed" conducting oxides because such multicomponent metallic oxides conduct electrons as well as oxygen ions at elevated temperatures.

Suitable mixed conducting oxides are represented by the structure $A_xA'_{x'}A''_{x''}B_yB'_{y'}B''_{y''}O_{3-z}$, where A,A',A'' are chosen from the group comprising Groups 1, 2 and 3 and the F block lanthanides; and B,B',B'' are chosen from the D block transition metals according to the Periodic Table of the Elements adopted by the IUPAC wherein $0<x\leq1, 0\leq x'\leq1, 0\leq x''\leq1, 0<y\leq1, 0\leq y'\leq1, 0\leq y''\leq1, x+x'+x''=1, y+y'+y''=1$ and z is a number which renders the compound charge neutral. Preferably, A, A' or A'' of the enumerated structure is a Group 2 metal selected from the group consisting of calcium, strontium, barium and magnesium.

Preferred mixed conducting oxides are represented by the formula $La_xA_{1-x}Co_yFe_{1-y}O_{3-z}$ wherein x is between 0 and 1, y is between 0 and 1 and A is selected from barium, strontium or calcium. Most preferably, the dense layer and/or the porous layer is formed from a multicomponent metallic oxide selected from the group consisting of $La_{0.2}Ba_{0.8}Co_{0.8}Fe_{0.2}O_{3-x}$, $Pr_{0.2}Ba_{0.8}Co_{0.8}Fe_{0.2}O_{3-x}$ and $La_{0.2}Ba_{0.8}Co_{0.6}Cu_{0.2}Fe_{0.2}O_{3-x}$.

The thickness of the porous layers of the composite membranes can be varied to ensure sufficient mechanical strength of the composite membrane. The desired thickness of each porous layer is regulated by the following considerations. First, the porosity and average pore radius of each porous layer should be regulated such that oxygen flux is not impeded while maintaining sufficient mechanical strength. Second, the pores or channels of pores within each porous layer should be wide enough so that oxygen flux is not impeded, but not so wide as to cause pore filling during fabrication or sagging of the dense layer during operation. Third, each porous layer should be compatible with the dense layer in terms of chemical reactivity and adhesion and thermal expansion to reduce problems associated with cracking and delamination.

As shall be discussed in greater detail, the porous layers of the claimed composite ITMs can be fabricated from mixed conducting oxides as well as porous materials which do not conduct both oxygen ions and electrons at elevated temperatures (referred to as "inert" porous layers) with the proviso that porous layers contiguous to the dense mixed conducting oxide layer must be fabricated from one or a mixture of multicomponent metallic oxides. Therefore, the composite membranes can comprise a dense mixed conducting oxide layer and a plurality of inert porous layers and mixed conducting oxide layers so long as each porous layer which is contiguous to the dense mixed conducting oxide layer is formed from one or a mixture of mixed conducting oxides.

The porous layers act as a compatible mechanical support for the dense mixed conducting oxide layer and provide two interacting diffusion paths for oxygen;

through the pores, and through the solid. Surface kinetic rate limitations for gas-solid oxygen exchange are mitigated by the availability of a large "active" surface area in the small pore structure of the support, especially in the vicinity of the dense layer. On the other hand, the effect of the small pores in hindering diffusion is mitigated by fast ionic conduction in the solid.

The membranes of the present invention provide superior oxygen flux because the solid phase of the porous support layer is not "inert" but "active" in terms of transporting oxygen ions and electrons through the ITM. Moreover, adverse effects of intrinsic surface kinetic limitations are mitigated because the pores of the mixed conducting oxide porous layer of the composite membrane are small enough to bestow a relatively large specific gas-solid interfacial area for oxygen dissociation/association compared to membranes comprising a mixed conducting dense layer deposited onto a porous support which does not conduct oxygen ions or electrons.

The membranes according to the first embodiment of the invention comprise a dense mixed conducting oxide layer having no connected through porosity which is contiguous to a layer of a porous mixed conducting oxide layer having an average pore radius of less than about 10 micrometers. The dense and porous layers of the composite membrane can be fabricated from the same or different mixed conducting oxides. Moreover, each respective layer can be fabricated from a single mixed conducting oxide or a mixture of two or more mixed conducting oxides. Any combination of multicomponent metallic oxides can be used so long as the dense and porous layers are chemically and mechanically compatible under conditions used in the enumerated applications such as in a process for separating oxygen from an oxygen-containing gaseous mixture.

The thickness of the dense mixed conducting layer typically ranges from 0.01 micrometer to about 500 micrometers although preferably, the dense layer is fabricated as thinly as permitted by structural integrity considerations and has a thickness of less than about 100 micrometers. The porous mixed conducting oxide layer in contact with, and contiguous to the dense mixed conducting layer has a thickness ranging from 1 micrometer to about 2 millimeters. Porous layers not in contact with the dense mixed conducting layer, whether formed from a mixed conducting oxide or a material which is not a mixed conducting oxide, can be as thick as desired to ensure mechanical strength to the extent that the ultimate thickness does not impede gas diffusion. Typically, the total thickness of the composite membrane is less than about 5 mm, although membranes having a greater thickness are also contemplated. Preferably, the dense layer has a thickness ranging from 0.01 micrometer to about 500 micrometers.

The membranes of the present invention utilize active porous supports formed from mixed conducting oxides which active supports counteract surface kinetic limitations by increasing the active gas-solid interfacial area per unit volume. Therefore, as the average pore radius is reduced while maintaining a given porosity within each porous layer, surface kinetic limitations which reduce oxygen flux can be correspondingly diminished. The membranes of this invention provide superior oxygen flux because the average pore radius of the mixed conducting oxide porous layer situated contiguous to the dense mixed conducting oxide layer is restricted to below about 10 micrometers in order to mitigate surface kinetic limitations associated with oxygen passing through the membrane. A fairly thin porous mixed conducting layer having an average pore radius ranging from 0.1 to about 10 micrometers, situated contiguous to a dense mixed conducting layer provides increased interfacial area to counteract surface kinetic limitations, but does not cause any significant pressure drop or resistance to mass transfer.

Figure 2A:
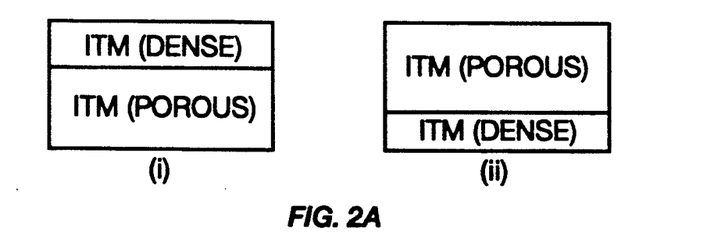
FIG. 2A presents composite membranes comprising a single dense layer of a mixed conducting oxide which layer is contiguous to a porous mixed conducting oxide layer.
Figure 2B:
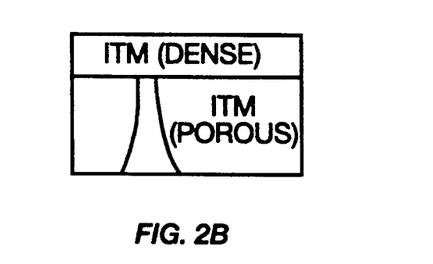
FIG. 2B presents a composite membrane comprising a plurality of individually deposited layers having successively larger pore radii as a function of distance away from the dense mixed conducting oxide layer.

The composite membranes of the first embodiment comprise several variations wherein the average pore radius of the porous mixed conducting oxide layer is controlled to achieve novel composite membrane configurations. Referring to FIG. 2, FIG. 2A(i) and 2A(ii) present a composite membrane comprising a single dense layer of a mixed conducting oxide, which layer is contiguous to a porous mixed conducting oxide layer having an average pore radius of less than about 10 micrometers. Such Figures differ only in terms of the orientation of the membrane with respect to the feedstream to be separated. FIG. 2B presents a composite membrane comprising a porous mixed conducting oxide layer which is actually a plurality of individually deposited layers having successively larger pore radii as a function of distance away from the dense mixed conducting oxide layer. Any number of layers are used such that the porous layer effectively possesses a pore structure which is funnel-shaped with an average pore radius increasing from 0.5 to about 10 micrometers or more moving away from the interface with the dense mixed conducting oxide layer. These layers can be fabricated by starting with a green state formed of a plurality of layers wherein each respective layer comprises successively larger particles. A preferred technique for manufacturing ultrathin solid state membranes is presented in U.S. patent application Ser. No. 07/816,206, filed on Jan. 3, 1992, now U.S. Pat. No. 5,160,618, which is assigned to Air Products and Chemicals, Inc., Allentown, Pa.

Figure 2C:
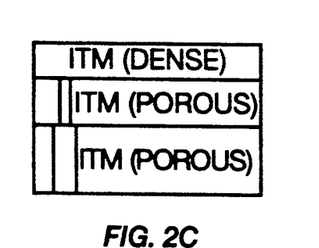
FIG. 2C presents a composite membrane comprising two or more contiguous porous mixed conducting oxide layers, one of which is contiguous with a dense mixed conducting oxide layer.

FIG. 2C presents an embodiment wherein the composite membrane comprises two or more contiguous porous mixed conducting oxide layers, one of which is contiguous with a dense mixed conducting oxide layer. The porous mixed conducting oxide layer contiguous to the dense mixed conducting oxide layer has an average pore radius of less than about 10 micrometers while the average pore radius of each subsequent mixed conducting oxide layer has an average pore radius which progressively increases as a function of distance from the dense layer. Each respective layer has a greater thickness than the layers deposited according to the embodiment represented in FIG. 2B such that the average pore radius of each respective porous mixed conducting oxide layer represents a stepped structure.

Figure 2D:
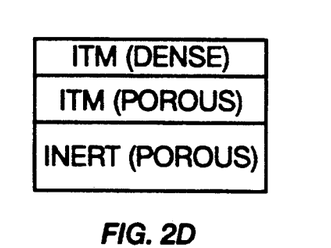
FIG. 2D presents a composite membrane comprising an embodiment similar to that according to FIG. 2C, except that one or more of the porous layers not in contact with the dense mixed conducting oxide layer is formed of a material which is not a mixed conductor.

FIG. 2D presents an embodiment similar to that according to FIG. 2C except one or more of the porous layers not in contact with the dense mixed conducting oxide layer is formed of a material which is not a mixed conductor. This porous layer is stated to be "inert" because the layer does not conduct oxygen ions and electrons at operating temperatures. The inert porous layer can be formed from materials which do not conduct electrons but which conduct oxygen ions, such as a high temperature oxygen compatible metal alloy, metal oxide-stabilized zirconia such as yttria-stabilized zirconia and calcium-stabilized zirconia or materials which do not conduct electrons or oxygen ions, such as alumina, magnesia, silica, titania and compounds and mixtures thereof.

Any combination of inert porous layers and porous mixed conducting oxide layers can be utilized so long as their coefficients of thermal expansion are compatible and chemical reactions are minimized between the respective layers at membrane operating temperatures.

Thin dense layers of the desired multicomponent metallic oxide having a thickness ranging from 100 microns to about 0.01 microns in thickness can be deposited onto the enumerated porous layers by known techniques. For example, the membrane composites can be manufactured by first forming a porous body from relatively coarse sized particles of the multicomponent metallic oxide. A slurry of finer particles of the same material or a similar, compatible multicomponent metallic oxide may then be coated onto the porous material and cured to the green state, the two layer system then being fired to form the composite membrane.

Alternatively, the composite membranes of the present invention can be prepared by applying a dense layer of a desired mixed conducting oxide onto the desired porous substrate by conventional chemical vapor deposition techniques followed by sintering to obtain the desired dense layer. In order to obtain an optimal dense coating, a smaller average pore radius in the surface of the porous support may be used compared to the average pore radius in the bulk. This may be achieved by using two or more porous layers which differ in properties such as pore radius and porosity.

Figure 2E:
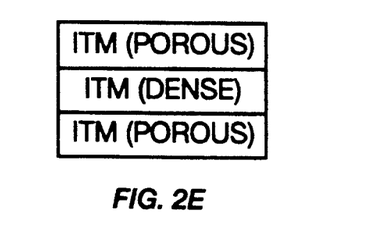
FIG. 2E presents a composite membrane comprising a dense multicomponent metallic oxide layer which is sandwiched between a plurality of porous mixed conducting oxide layers.

In a second embodiment, the composite membranes comprise a dense multicomponent metallic oxide layer which is sandwiched between a plurality of porous mixed conducting oxide layers having an average pore radius smaller than about 10 micrometers. This embodiment is depicted in FIG. 2E and can be fabricated according to the previously mentioned techniques.

The membranes of the present invention can be used to recover oxygen from an oxygen-containing gaseous mixture by delivering the oxygen-containing gaseous mixture into a first gas compartment which is separated from a second gas compartment by the subject membrane, establishing a positive oxygen partial pressure difference between the first and second gas compartments by producing an excess oxygen partial pressure in the first gas compartment and/or by producing a reduced oxygen partial pressure in the second gas compartment; contacting the oxygen-containing gaseous mixture with the membrane at a temperature greater than about 500° C. to separate the compressed oxygen-containing gaseous mixture into an oxygen permeate stream and an oxygen-depleted gaseous stream and recovering the oxygen permeate stream.

Any conventional apparatus can be utilized to house the ion transport membranes of the present invention whereby the membrane forms a partition between the first and second gas compartments. A representative apparatus is disclosed in U.S. Pat. No. 5,035,727, issued to Air Products and Chemicals, Inc., Allentown, Pa.

The composite membranes of this invention are capable of separating oxygen from oxygen-containing gaseous mixtures containing one or more components selected from carbon dioxide, water and volatile hydrocarbons. The amount of oxygen present in such gaseous mixtures typically ranges between about 0.01 vol. % to 50 vol. % oxygen. The preferred oxygen-containing gaseous mixture is atmospheric air.

If the multicomponent metallic oxide demonstrates both oxygen ionic and electronic conductivities, the oxide is said to be mixed conducting. Particularly useful for practical purposes are those in which the ionic and electronic conductivities are both high. When fabricated in the form of a thin membrane, such oxides can be used to separate oxygen from an oxygen-containing gaseous mixture such as air by maintaining an oxygen partial pressure difference between the feed and permeate sides of the ion transport membrane, i.e., the first and second gas compartments. Examples of such materials are described in U.S. Pat. No. 4,330,633 and Japanese Patent Application 61-21717.

Japanese Patent Application 61-21717 teaches mixed conducting perovskites represented by the structure $La_{1-x}Sr_xCo_{1-y}Fe_yO_{3-d}$ wherein x ranges from 0.1 to 1.0 and y ranges from 0.05 to 1.0. Oxides of this type have an oxygen ionic conductivity of approximately $10^{-2}$ $ohm^{-1}cm^{-1}$ and an electronic conductivity of approximately $10^2$ $ohm^{-1}cm^{-1}$ at a temperature of about 800° C. When an oxygen-containing gaseous mixture at a higher oxygen partial pressure is applied to the first gas compartment which is separated from the second gas compartment by a membrane having a dense layer formed from the enumerated oxide, oxygen will adsorb and dissociate on the membrane surface, become ionized and diffuse through the solid and deionize, associate and desorb as an oxygen gas stream at a lower oxygen partial pressure in the second gas compartment.

The necessary circuit of electrons to supply this ionization/deionization process is maintained internally in the oxide via its electronic conductivity. This type of separation process is particularly suitable for separating oxygen from a gas stream containing a relatively high partial pressure of oxygen, i.e., greater than or equal to 0.2 atm. Multicomponent metallic oxides which demonstrate both oxygen ionic conductivity and electronic conductivity typically demonstrate an oxygen ionic conductivity ranging from 0.01 $ohm^{-1}cm^{-1}$ to 100 $ohm^{-1}cm^{-1}$ and an electronic conductivity ranging from about 1 $ohm^{-1}cm^{-1}$ to 100 $ohm^{-1}cm^{-1}$.

Some multicomponent metallic oxides are primarily or solely oxygen ionic conductors at elevated temperatures. An example is $(Y_2O_3)_{0.1}(Zr_2O_3)_{0.9}$ which has an oxygen ionic conductivity of 10 $ohm^{-1}cm^{-1}$ at 1000° C. and an ionic transport number (the ratio of the ionic conductivity to the total conductivity) close to 1. A multicomponent oxide of this type can be used to separate oxygen in the following manner. European Patent Application EP 0399833A1 describes a membrane formed from a composite of this oxide with a separate electronically conducting phase, such as platinum or another noble metal. The electronic conducting phase will provide the return supply of electrons through the structure allowing oxygen to be ionically conducted through the composite membrane under a partial pressure gradient driving force as described previously.

Another category of multicomponent metallic oxides exhibit primarily or solely electronic conductivity at elevated temperatures and their ionic transport numbers are close to zero. An example is $Pr_xIn_yO_z$ which is described in European Patent Application EP 0,399,833 A1. Such materials may be used in a composite membrane with a separate oxygen ionic conducting phase such as a stabilized $Zr_2O_3$. A membrane constructed from a composite of this type may also be used to separate oxygen from an oxygen-containing stream such as air by applying an oxygen partial pressure gradient as the driving force. Typically, the multicomponent oxide electronic conductor is placed in intimate contact with an oxygen ionic conductor.

The next steps of the process comprise establishing a positive oxygen partial pressure difference between the first and second gas compartments by producing an excess oxygen partial pressure in the first compartment and/or by producing a reduced oxygen partial pressure in the second gas compartment and contacting the oxygen-containing gaseous mixture with the ion transport membrane at a temperature greater than about 500° C. to separate the compressed oxygen-containing gaseous mixture into an oxygen permeate stream and an oxygen-depleted gaseous stream.

A difference in oxygen partial pressure between the first and second compartments provides the driving force for effecting the separation when the process temperature is elevated to a sufficient temperature to cause oxygen in the oxygen-containing gaseous mixture residing in the first compartment to adsorb, become ionized via the membrane and to be transported through the membrane in the ionic form. A pure oxygen product is collected in the second gas compartment wherein ionic oxygen is converted into the neutral form by the release of electrons in the second gas compartment which resides at lower oxygen partial pressures than the first gas compartment.

A positive oxygen partial pressure difference between the first and second gas compartments can be created by compressing air in the first compartment to a pressure sufficient to recover the oxygen permeate stream at a pressure of greater than or equal to about one atmosphere. Typical pressures range from about 15 psia to about 250 psia and the optimum pressure will vary depending upon the amount of oxygen in the oxygen-containing gaseous mixture. Conventional compressors can be utilized to achieve the compression required to practice the present step of the process. Alternately, a positive oxygen partial pressure difference between the first and second gas compartments can be achieved by evacuating the second gas compartment to a pressure sufficient to recover the oxygen permeate.

The final step of the process comprises recovering the oxygen-containing gaseous mixture by storing the substantially pure oxygen in a suitable container or transferring the same to another process. The oxygen permeate typically comprises pure oxygen or high purity oxygen defined as a gas generally containing at least about 90 vol. % $O_2$, preferably more than about 95 vol % $O_2$ and especially more than 99 vol. % $O_2$.

The following examples are provided to further illustrate Applicants' claimed process. Such examples are illustrative and are not intended to limit the scope of the appended claims.

MATHEMATICAL MODELLING AND CONSTRUCTIVE REDUCTION TO PRACTICE

The mathematical model for the dense mixed conducting oxide layer was based upon two constitutive equations; one for the kinetics of interfacial adsorption/desorption and ionization/deionization, and another for the co-diffusion of oxygen anions and electron-holes through the solid. A glossary of key notation is provided in Table 1. In formulating the kinetics-equations, the following standard sequence of elementary steps was assumed as proposed by S. Dou et al., "Mechanism of Oxygen Permeation Through Lime-Stabilized Zirconia," Journal of the Electrochemical Society, Vol. 132, pp 1843–1849 (1985).

$$O_{2(gas)} \rightleftharpoons 2O_{(ads)} \qquad \text{Eq. 1}$$

$$O_{(ads)} + V_o \rightleftharpoons O_x^o + 2\dot{h} \qquad \text{Eq. 2}$$

Accordingly, the net rate of adsorption on the solid surface is represented by $$\tfrac{1}{2}R_{ads} = k_a(1-\theta)^2 p_{o2} - k_d \theta^2 \qquad \text{Eq. 3}$$

wherein $$\theta = \frac{[O_{(ads)}]}{m} \qquad \text{Eq. 4}$$

The net rate of ionization and incorporation of ions into the lattice is represented by $$R_{ion} = k_1[O_{ads}]\frac{[V_o]}{N_o} - k_2[\dot{h}]^2[O_x^o] \qquad \text{Eq. 5}$$

The various species concentrations are subject to two constraints, namely, anion conservation and electroneutrality, as represented by the following formulae.

The anion conservation condition:

$$[V_o] + [O_x^o] = N_o \qquad \text{Eq. 6}$$

The electroneutrality condition:

$$2[V_o] + [\dot{h}] = [A'_A] \qquad \text{Eq. 7}$$

The solid phase equations were formulated based upon literature work on ambipolar diffusion (L. Heyne, "Electrochemistry of Mixed Ionic-Electronic Conductors in Solid Electrolytes", (S. Geller, editor) Springer Verlag Topics in Applied Physics, Vol. 21 New York (1977) p. 169) and ion-exchange (F. Hefflerich and M. S. Plesset, "Ion Exchange Kinetics: A Nonlinear Diffusion Problem", Journal of Chemical Physics, Vol 28, p. 418 (1958)).

The fluxes of oxygen anions (subscript i) and electron-holes (subscript p) are given by the Nernst-Planck equation:

$$J_i = -D_i \frac{[V_o]}{N_o}\left[\frac{d[O_x^o]}{dx} + \frac{Z_i[O_x^o]F}{RT}\frac{d\phi}{dx}\right] \qquad \text{Eq. 8}$$

$$J_p = -D_p\left[\frac{d[\dot{h}]}{dx} + \frac{Z_p[\dot{h}]F}{RT}\frac{d\phi}{dx}\right] \qquad \text{Eq. 9}$$

The species concentrations are subject to the electroneutrality and the anion conservation conditions given above. Moreover, the fluxes are subject to the net zero current condition:

$$Z_i J_i + Z_p J_p = 0. \qquad \text{Eq. 10}$$

The flux equation can be rewritten making use of the conditions:

$$J_i = -\frac{D_i \frac{[V_o]}{N_o} D_p(Z_p^2[\dot{h}] + Z_i^2[O_x^o])}{Z_i^2 D_i \frac{[V_o]}{N_o}[O_x^o] + Z_p^2 D_p[\dot{h}]} \frac{d[O_x^o]}{dx} \qquad \text{Eq. 11}$$

Based on the above premise, the governing equations and boundary conditions for the performance of a membrane comprising a dense layer of a multicomponent metallic oxide without a porous supporting layer are represented by the following formulae:
Feed side interface:

$$2J_{o2} = R_{ads} = R_{ion} = J_i, \text{ with } p_{o2} = p_{o2}^{feed} \text{ or } p' \qquad \text{Eq. 12}$$

Membrane solid phase:

$$\frac{dJ_i}{dx} = 0, \text{ and, } J_i \text{ is given by Equation 11, above.} \qquad \text{Eq. 13}$$

Permeate side interface:

$$J_i = -R_{ion} = -R_{ads} = 2J_{o2}, \text{ with } p_{o2} = p_{o2}^{permeate} \text{ or } p'' \qquad \text{Eq. 14}$$

Two additional governing equations are the electroneutrality and anion conservation conditions given above. In total, these equations are used to solve for the flux $J_{o2}$ and the concentrations of: $O_{ads}$, $O_x^o$, $V_o$, and $h$.

Twe above-mentioned solutions were solved discretizing the derivatives using backward difference. The resulting equations, together with the boundary conditions formed a set of nonlinear algebraic equations which were solved using a standard software package, GAMS (A. Brooke, D. Kendrick and A. Meeraus, "GAMS: A User's Guide", Scientific Press Palo Alto (1988)), and an equation solver therein called MINOS.

Figure 3:
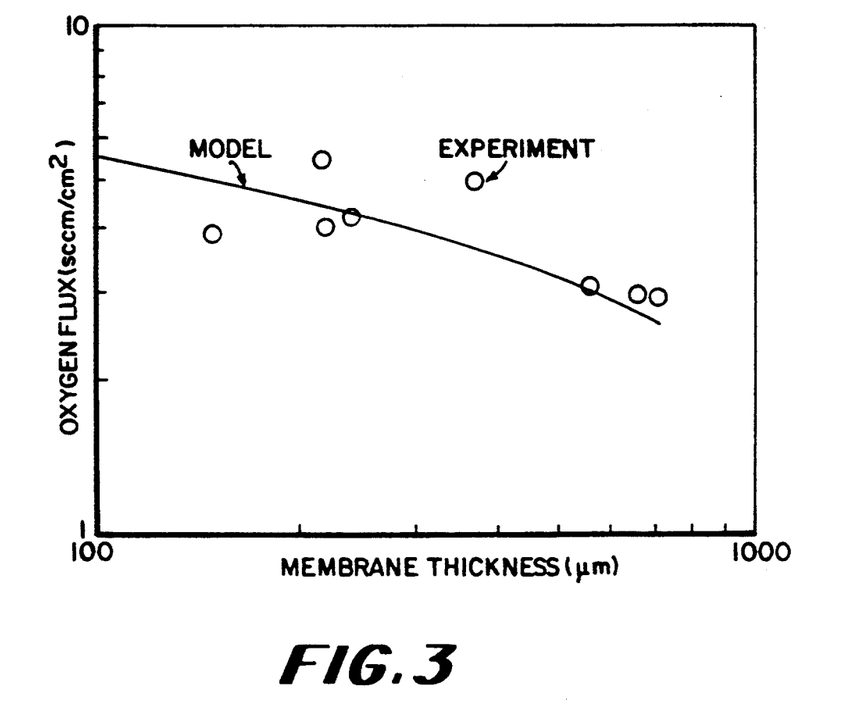
FIG. 3 illustrates oxygen flux values achieved by a composite membrane consisting of a dense layer of a mixed conducting metallic oxide obtained by actual experiments compared to values predicted by computer simulation.

The experimental oxygen permeation data illustrated in FIG. 1, obtained with the mixed conducting perovskite $La_{0.2}Ba_{0.8}Co_{0.8}Fe_{0.2}O_{3-x}$ at 850° C., were first used to test the computer simulation. Using literature data for some parameters and adjusting the others to give an improved least squares fit, the values of the parameters listed in Table 2 were used in the computer simulation to fit the experimental results for the variation of oxygen flux with the thickness of the dense layer of mixed conducting oxide. The results are given in FIG. 3 which illustrates a good fit of the simulation with the data, including the decrease of the gradient of the plot with decreasing dense layer thickness below about 0.5 mm due to surface kinetic limitations. No further adjustments were made to the parameters listed in Table 2 and the parameters were used to define the properties of the mixed conducting oxide layer through the rest of the examples.

The "dusty gas" model was used to model gas phase diffusion within the porous layers. The model accounts, in a fairly general manner, for the three key mechanisms of pore transport: Bulk diffusion, Knudsen diffusion, and Darcy flow. This generality enables the simulation to handle a range of pore dimensions and operating conditions in a robust manner. The dusty gas model equations are readily available in the literature for defining transport of a binary gas mixture through a porous support (see equation 5.26 in R. Jackson, "Transport in Porous Catalysts", Elsevier, Amsterdam (1977)).

The composite membrane used to model the interplay of solid phase diffusion and pore transport possessed three layers: a top porous support layer situated to accept feed gas, a bottom porous support layer and a dense layer sandwiched between such porous layers.

The system mass balance (or conservation) equations consist of one dimensional transport in the two regions of each support layer (e.g., TS (Top Solid) and TP (Top Pore)) with oxygen exchange between the two regions along the pore; and one dimensional transport in the middle layer (MS (Middle Solid)). By way of representing real pore structures, the diffusion coefficients in both phases of the support layers and the Darcy permeability coefficients in the pores of the support layers are all divided by a tortuosity factor, $\tau$. The governing equations and boundary conditions for the composite membrane are as follows:

Governing Equations for the Top Layer Pore Region (TP):

$$\frac{d(\epsilon J_i)}{dx} + \frac{2\epsilon}{r} R_i = 0 \qquad \text{Eq. 15}$$

The subscript i is 1 for oxygen molecules and 2 for the nonpermeating components. Accordingly, $J_i$ is given by the dusty gas model, with a finite $J_1$ and a zero $J_2$.

$$2R_1 = R_{ads} = R_{ion} \text{ (these vary with axial position.)} \qquad \text{Eq. 16}$$

$$R_2 = 0$$

Boundary conditions for the Top Layer Pore Region (TP):
At the feed side interface,
$$p_i = p_i^{feed} \text{ or } p'_i \qquad \text{Eq. 17}$$

At the interface with the middle layer:

$$2J_1 = R_{ads} = R_{ion} \text{ (evaluated using local concentrations).} \qquad \text{Eq. 18}$$

Governing Equations for the Top Layer Solid Region (TS):

$$\frac{d((1-\epsilon)J_i)}{dx} - \frac{2\epsilon}{r} R_i = 0 \qquad \text{Eq. 19}$$

The subscript i represents atomic oxygen anions. $J_i$ is the ITM flux expressed by Equation 11.

$$R_1 = R_{ads} = R_{ion} \text{ (these vary with axial position.)} \qquad \text{Eq. 20}$$

Boundary conditions for the Top Layer Solid Region (TS):
At the feed side interface, $$J_1 = R_{ads} = R_{ion} \text{ (evaluated using } p_i^{feed} \text{ or p'}_i\text{).} \qquad \text{Eq. 21}$$

At the interface with the middle layer, the solid phase concentrations of the various species are continuous. i.e. have the same value on either side of the boundary at the interface.

Governing Equations for the Middle Layer Solid (MS):

$$\frac{dJ_i}{dx} = 0 \qquad \text{Eq. 22}$$

The subscript i represents atomic oxygen anions. $J_i$ is the ITM flux expressed by Equation 11.

Boundary conditions for the Middle Layer Solid (MS):
At the interface with the top layer, $$2\epsilon J_{O2}^{TP} + (1-\epsilon) J_i^{TS} = J_i^{MS} \qquad \text{Eq. 23}$$

Similarly, at the interface with the bottom layer, $$2\epsilon J_{O_2}^{BP} + (1 - \epsilon) J_i^{BS} = J_i^{MS} \qquad \text{Eq. 24}$$

Governing Equations for the Bottom Layer Pore Region (BP):
The equations given above for TP apply here as well.
Boundary conditions for the Bottom Layer Pore Region (BP):
At the interface with the middle layer:

$2J_1 = -R_{ads} = -R_{ion}$ (evaluated using local concentrations). Eq. 25

At the permeate side interface,
$p_i = p_i^{permeate}$ or $p_i''$ Eq. 26

Governing Equations for the Bottom Layer Solid Region (BS):
The equations given above for TS apply here as well.
Boundary conditions for the Bottom Layer Solid Region (BS):
At the interface with the middle layer, the solid phase concentrations of the various species are continuous. i.e. have the same value on either side of the boundary at the interface:
At the permeate side interface, $J_1 = -R_{ads} = -R_{ion}$ (evaluated using $p_i^{permeate}$ or $p_i''$). Eq. 27

The solution of the equations for the composite membrane evolved from the solution for the dense layer alone.

TABLE 1
NOTATIONS

| | |
|---|---|
| $[A_{A'}]$ | Concentration of bivalent A' cations which substitute trivalent A-site cation $\left(\frac{atoms}{cm^3}\right)$ |
| $D_i$ | Diffusion coefficient of oxygen ions $\left(\frac{cm^2}{sec}\right)$ |
| $D_p$ | Diffusion coefficient of electron-holes $\left(\frac{cm^2}{sec}\right)$ |
| F | Faraday constant |
| J | Species flux $\left(\frac{moles \text{ or atoms}}{cm^2 \ sec}\right)$ |
| [h] | Concentration of electron-holes $\left(\frac{atoms}{cm^3}\right)$ |
| $k_a$ | Adsorption rate constant $\left(\frac{moles}{cm^2 \ sec \ atm}\right)$ |
| $k_d$ | Desorption rate constant $\left(\frac{atoms}{cm^2 \ sec}\right)$ |
| $k_1$ | Ionization rate constant $\left(\frac{1}{sec}\right)$ |

TABLE 1-continued
NOTATIONS

| | |
|---|---|
| $k_2$ | Deionization rate constant $\left(\frac{cm^7}{atoms^2 \ sec}\right)$ |
| l | Membrane thickness (cm) |
| m | Monolayer Adsorption capacity of the membrance surface $\left(\frac{atoms}{cm^2}\right)$ |
| $N_o$ | Stoichiometric oxygen site concentration $\left(\frac{atoms}{cm^3}\right)$ |
| $[O_x^*]$ | Lattice oxygen anion concentration $\left(\frac{atoms}{cm^3}\right)$ |
| $[O_{ads}]$ | Adsorbed oxygen anion concentration $\left(\frac{atoms}{cm^2}\right)$ |
| p | Pressure (atm) |
| R | Gas constant |
| T | Temperature (°Kelvin) |
| $[V_o]$ | Lattice oxygen vacancy concentration $\left(\frac{atoms}{cm^3}\right)$ |
| $\epsilon$ | Support layer void area/volume fraction |
| $\phi$ | Electrical potential (Volts) |
| $\theta$ | Fractional surface coverage by adsorbed oxygen atoms |
| $\tau$ | Support layer pore/solid tortuosity factor |

N.B: "Atoms" indicate gram atoms.

TABLE 2
PARAMETERS OF THE ITM SOLID
Composition: $La_{0.2}Ba_{0.8}Co_{0.8}Fe_{0.2}O_{3-\delta}$
Temperature: 850° C.

| Parameter | Value |
|---|---|
| $A_{A'}$ | 0.0207 $\frac{atoms}{cm^3}$ |
| $N_o$ | 0.0777 $\frac{atoms}{cm^3}$ |
| m | 1.04E-9 $\frac{atoms}{cm^2}$ |
| $D_p$ | 2E-2 $\frac{cm^2}{sec}$ |
| $D_i$ | 4E-5 $\frac{cm^2}{sec}$ |
| $k_1$ | 9.6E-6 $\frac{1}{sec}$ |
| $k_2$ | 2.9 $\frac{cm^7}{atoms^2 \ sec}$ |
| $k_a$ | 2E-2 $\frac{moles}{cm^2 \ sec\text{-}atm}$ |
| $k_d$ | 2.5E-2 $\frac{atoms}{cm^2 \ sec}$ |

N.B. — "atoms" denote gram-atoms

EXPERIMENTAL SECTION

The membranes of the claimed invention have been constructively reduced to practice by the detailed mathematical computer simulation described above. The simulations were carried out initially for a dense layer of a mixed conducting perovskite oxide, and then for thinner dense mixed conducting oxide layers contiguous with porous layers of the "inert" and "active" types. The simulation confirmed the utility of the invention in increasing the oxygen permeation rate compared with a thicker dense mixed conducting layer under identical operating conditions.

EXAMPLE 1

Oxygen Flux Obtained with a Membrane Comprising a Dense Layer of Mixed Conducting Oxide The experimental oxygen permeation data illustrated in FIG. 1, obtained with the mixed conducting perovskite $La_{0.2}Ba_{0.8}Co_{0.8}Fe_{0.2}O_{3-x}$ at 850° C., were initially used to test the computer simulation. Using literature data for some parameters and adjusting others to give an improved least squares fit, the values of the parameters listed in Table 2 were used in the computer simulation to fit the experimental results for the variation of oxygen permeance with the thickness of the dense mixed conducting oxide membrane. The results are given in FIG. 3, which illustrates a good fit of the simulation with the data, including the decrease of the gradient of the plot with decreasing dense layer thickness below about 0.5 mm due to surface kinetic limitations. No further adjustments were made to the parameters listed in Table 2, which parameters were used to define the properties of the mixed conducting oxide phase throughout these examples.

The oxygen fluxes, in units of $sccm/cm^2$ of membrane surface, obtained with dense layers of the mixed conducting oxide at four different thicknesses in the range 1.010 to 2.200 mm were then calculated using the computer simulation. The results are listed in Table 3 for two different combinations of feed and permeate streams; an oxygen partial pressure of 16 psia (827 torr) in the feed with the permeate oxygen pressure at 0.0193 psia (1 torr) and an oxygen partial pressure of 32 psia (1654 torr) in the feed with the permeate oxygen pressure at 3 psia (155 torr). As expected, the oxygen flux increases with decreasing dense membrane thickness and with increasing ratio of the feed to permeate oxygen partial pressures.

TABLE 3

OXYGEN FLUX OBTAINED WITH A MEMBRANE COMPRISING A DENSE LAYER OF MIXED CONDUCTING OXIDE

| RUN NO. | Dense Layer Thickness ($\mu m$) | $PO_2$ Feed (psia) | $PO_2$ Permeate (psia) | Calculated $O_2$ Flux ($sccm/cm^2$) |
|---|---|---|---|---|
| 1 | 2010 | 16 | 0.2 | 1.30 |
| 2 | 2010 | 32 | 3 | 0.26 |
| 3 | 1010 | 16 | 0.02 | 2.17 |
| 4 | 1010 | 32 | 3 | 0.49 |
| 5 | 2200 | 16 | 0.02 | 1.21 |
| 6 | 2200 | 32 | 3 | 0.23 |
| 7 | 1200 | 16 | 0.02 | 1.92 |
| 8 | 1200 | 32 | 3 | 0.41 |

EXAMPLE 2

Oxygen Flux Obtained With A Membrane Comprising A Porous Mixed Conducting Oxide Layer Contiguous With A Dense Mixed Conductor Oxide Layer This example illustrates the first embodiment of the invention in which the membrane comprises a dense mixed conducting oxide layer contiguous with a porous layer of mixed conducting oxide which has an average pore radius of less than about 10 micrometers. The results of the computer simulation are summarized in Table 4 for the case in which the contiguous porous layer is situated on the permeate side of the dense layer. Runs 9 to 16 demonstrate that oxygen flux increases slightly when the dense layers of Runs 1 to 8 of Table 3 are replaced by thin (10 and 200 micrometer) dense mixed conducting oxide layers placed on porous "inert" non-conducting support layers such that the composite membrane structures have equivalent thicknesses. However, a comparison of Runs 9 to 12 with 13 to 16, respectively, shows that in this type of composite, only minor increases in oxygen flux results from decreasing the dense layer thickness from 200 to 10 micrometers because of the severe surface kinetic limitations of oxygen permeation.

A comparison of runs 17 to 24 (illustrated in FIG. 2A(i)) with their respective runs 9 to 16 and 1 to 8 shows the benefits of the claimed invention in increasing the oxygen flux by counteracting some of the surface kinetic limitations. Runs 17 to 20 illustrate this point in the case of thinner (10 $\mu m$) dense layer membrane which is otherwise the more surface kinetics limited.

TABLE 4

OXYGEN FLUX OBTAINED WITH COMPOSITE MEMBRANE HAVING POROUS LAYERS SITUATED ON MEMBRANE PERMEATE SIDE

| Run No. | Dense layer Thickness ($\mu m$) | Porous Layer* (A) | | | Porous Layer* (B) | | | $P(O_2)$ Feed (psia) | $P(O_2)$ Permeate (psia) | Calculated $O_2$ Flux ($sccm/cm^2$) |
|---|---|---|---|---|---|---|---|---|---|---|
| | | Type | Thickness ($\mu m$) | Pore Radius ($\mu m$) | Type | Thickness ($\mu m$) | Pore Radius ($\mu m$) | | | |
| 9 | 10 | inert | 2000 | 0.5 | None | | | 16 | 0.02 | 2.64 |
| 10 | 10 | inert | 2000 | 0.5 | None | | | 32 | 3 | 2.22 |
| 11 | 10 | inert | 1000 | 0.5 | None | | | 16 | 0.02 | 3.06 |
| 12 | 10 | inert | 1000 | 0.5 | None | | | 32 | 3 | 2.34 |
| 13 | 200 | inert | 2000 | 0.5 | None | | | 16 | 0.02 | 1.73 |
| 14 | 200 | inert | 2000 | 0.5 | None | | | 32 | 3 | 1.18 |
| 15 | 200 | inert | 1000 | 0.5 | None | | | 16 | 0.02 | 2.00 |
| 16 | 200 | inert | 1000 | 0.5 | None | | | 32 | 3 | 1.22 |
| 17 | 10 | active | 2000 | 0.5 | None | | | 16 | 0.02 | 6.63 |
| 18 | 10 | active | 2000 | 0.5 | None | | | 32 | 3 | 6.23 |
| 19 | 10 | active | 1000 | 0.5 | None | | | 16 | 0.02 | 8.62 |
| 20 | 10 | active | 1000 | 0.5 | None | | | 32 | 3 | 7.18 |
| 21 | 200 | active | 2000 | 0.5 | None | | | 16 | 0.02 | 3.00 |
| 22 | 200 | active | 2000 | 0.5 | None | | | 32 | 3 | 1.89 |

TABLE 4-continued
OXYGEN FLUX OBTAINED WITH COMPOSITE MEMBRANE HAVING POROUS LAYERS SITUATED ON MEMBRANE PERMEATE SIDE

| Run No. | Dense layer Thickness ($\mu$m) | Porous Layer* (A) | | | Porous Layer* (B) | | | $P(O_2)$ Feed (psia) | $P(O_2)$ Permeate (psia) | Calculated $O_2$ Flux (sccm/cm$^2$) |
|---|---|---|---|---|---|---|---|---|---|---|
| | | Type | Thickness ($\mu$m) | Pore Radius ($\mu$m) | Type | Thickness ($\mu$m) | Pore Radius ($\mu$m) | | | |
| 23 | 200 | active | 1000 | 0.5 | None | | | 16 | 0.02 | 3.85 |
| 24 | 200 | active | 1000 | 0.5 | None | | | 32 | 3 | 2.03 |
| 29 | 10 | active | 2000 | 0.5–10+ | None | | | 16 | 0.02 | 12.14 |
| 30 | 10 | active | 2000 | 0.5–10+ | None | | | 32 | 3 | 8.43 |
| 31 | 10 | active | 1000 | 0.5–10+ | None | | | 16 | 0.02 | 14.49 |
| 32 | 10 | active | 1000 | 0.5–10+ | None | | | 32 | 3 | 8.70 |
| 33 | 10 | active | 50 | 0.5 | Active | 1950 | 10 | 16 | 0.02 | 14.91 |
| 34 | 10 | active | 50 | 0.5 | Active | 1950 | 10 | 32 | 3 | 8.84 |
| 35 | 10 | active | 50 | 0.5 | Active | 950 | 10 | 16 | 0.02 | 16.61 |
| 36 | 10 | active | 50 | 0.5 | Active | 950 | 10 | 32 | 3 | 8.91 |
| 37 | 10 | active | 50 | 0.5 | Inert | 1950 | 10 | 16 | 0.02 | 14.86 |
| 38 | 10 | active | 50 | 0.5 | Inert | 1950 | 10 | 32 | 3 | 8.83 |
| 39 | 10 | active | 50 | 0.5 | Inert | 950 | 10 | 16 | 0.02 | 16.35 |
| 40 | 10 | active | 50 | 0.5 | Inert | 950 | 10 | 32 | 3 | 8.89 |

*Porous layers have $\epsilon = 0.32$ and $\tau = 2.2$ and straight cylindrical pores unless otherwise indicated.
+Funnel shaped pores Further increases in oxygen flux may be obtained by changing the pore geometry in the active layer to minimize gas phase pore diffusion limitations of the flux on the permeate side. Runs 29 to 32 (illustrated in FIG. 2B) are calculated for divergent funnel shaped pores with a radius increasing from 0.5 to 10 micrometers moving away from the interface with the dense layer. A comparison with runs 17 to 20, in which the pores of the active layer are straight cylindrical in shape with an average radius of 0.5 $\mu$m, shows that the oxygen flux may be increased by as much as a factor of about 1.9.

Similar effects can be achieved with multiple layers of porous supports of increasing average radius contiguous with the active layer. Particularly large increases in the oxygen flux can be obtained when a thin (e.g., 50 micrometers) active layer of less than 10 micrometer average pore radius and contiguous with a thinner (10 micrometer) dense layer is further supported by thicker layers of larger pore radius. This is shown in runs 33 through 36 (illustrated in FIG. 2C), compared with 17 to 20 and 1 to 4. In runs 33 to 36, the thin, active porous layer counteracts the surface kinetic limitations of the oxygen flux of the thin dense layer in the manner of this invention while the thicker porous layer having a larger average pore radius provides mechanical rigidity and strength while minimally impeding gas diffusion through the permeate side.

Runs 37 to 40 (illustrated in FIG. 2D) show that similar effects can be obtained with a large pore "inert" support layer separated from the dense mixed conducting layer by a thin active small pore contiguous layer.

The relative utility of composite membrane structures of the types illustrated in runs 33 to 36 and runs 37 to 40 depends also on factors such as high temperature strength and resistance to thermal stress.

EXAMPLE 3
Oxygen Flux Obtained With Active Porous Layer Contiguous With Feed Side Of Dense Layer Of Mixed Conducting Oxide As Presented In FIG. 2A(ii)

This example illustrates further the first embodiment of the invention in which the membrane structure contains a dense mixed conducting oxide layer contiguous with a porous layer of mixed conducting oxide which has an average pore radius of less than 10 micrometer, for the case in which the contiguous porous layer is situated on the feed side of the dense layer. The results of the computer simulation are summarized in Table 5. The calculations include pore diffusion resistance due to gases other than oxygen in the feed, in particular the presence of nitrogen in the ratio to oxygen of 4:1 as in air.

A comparison of runs 45 to 48 with runs 1 to 4 of Table 3 shows that a minor increase in oxygen flux results from the use of an "inert" support contiguous with a thin (10 micrometer) dense layer of mixed conducting oxide. Runs 49 to 52 show, however, that a larger increase in flux results when the equivalent thickness composite structure comprises an "active" porous layer on the feed side of the membrane in accordance with the claimed invention.

TABLE 5
OXYGEN FLUX OBTAINED WITH COMPOSITE MEMBRANE HAVING POROUS LAYERS SITUATED ON MEMBRANE FEED SIDE

| Run No. | Dense layer Thickness ($\mu$m) | Porous Layer* (A) | | | Porous Layer* (B) | | | $P(O_2)$ Feed (psia) | $P(O_2)$ Permeate (psia) | Calculated $O_2$ Flux (sccm/cm$^2$) |
|---|---|---|---|---|---|---|---|---|---|---|
| | | Type | Thickness ($\mu$m) | Pore Radius ($\mu$m) | Type | Thickness ($\mu$m) | Pore Radius ($\mu$m) | | | |
| 45 | 10 | inert | 2000 | 0.5 | None | | | 16 | 0.02 | 3.57 |
| 46 | 10 | inert | 2000 | 0.5 | None | | | 32 | 3 | 2.14 |
| 47 | 10 | inert | 1000 | 0.5 | None | | | 16 | 0.02 | 4.90 |
| 48 | 10 | inert | 1000 | 0.5 | None | | | 32 | 3 | 2.68 |
| 49 | 10 | active | 2000 | 0.5 | None | | | 16 | 0.02 | 4.36 |
| 50 | 10 | active | 2000 | 0.5 | None | | | 32 | 3 | 3.46 |
| 51 | 10 | active | 1000 | 0.5 | None | | | 16 | 0.02 | 7.96 |
| 52 | 10 | active | 1000 | 0.5 | None | | | 32 | 3 | 6.29 |

*Porous layers have $\epsilon = 0.32$ and $\tau = 2.2$ and straight cylindrical pores unless otherwise indicated.

EXAMPLE 4

Oxygen Flux Obtained With Two Active Porous Layers Contiguous With And Separated By A Dense Layer Of Mixed Conducting Oxide This example illustrates the second embodiment of the invention in which the membrane structure contains a dense mixed conducting oxide layer separating and contiguous with two porous layers of mixed conducting oxide which have an average pore radius of less than about 10 micrometers. The results of the computer simulation are summarized in Table 6. As in Example 3, the calculations include pore diffusions resistance due to gases other than oxygen in the feed, in particular the presence of nitrogen in the ratio to oxygen of 4:1, as in air.

A comparison of runs 55 to 58 with runs 1 to 4 of Table 3 shows that a minor increase in oxygen flux results from the use of "inert" supports contiguous with a thin (10 micrometer) dense layer of mixed conducting oxide. Runs 59 to 62 (illustrated in FIG. 2E) show, however, that a much larger increase in flux results when the equivalent thickness composite structure comprises two "active" porous layers contiguous with and separated by a thin (10 micrometer) dense layer of mixed conducting oxide, in accordance with the claimed invention.

TABLE 6

OXYGEN FLUX OBTAINED WITH COMPOSITE MEMBRANE COMPRISING TWO ACTIVE POROUS LAYERS CONTIGUOUS WITH AND SEPARATED BY A DENSE LAYER OF MIXED CONDUCTING OXIDE

| Run No. | Dense layer Thickness ($\mu$m) | Porous Layer* (A) | | | Porous Layer* (B) | | | $P(O_2)$ Feed (psia) | $P(O_2)$ Permeate (psia) | Calculated $O_2$ Flux (sccm/cm$^2$) |
| --- | --- | --- | --- | --- | --- | --- | --- | --- | --- | --- |
| | | Type | Thickness ($\mu$m) | Pore Radius ($\mu$m) | Type | Thickness ($\mu$m) | Pore Radius ($\mu$m) | | | |
| 55 | 10 | inert | 500 | 0.5 | inert | 1500 | 0.5 | 16 | 0.02 | 2.11 |
| 56 | 10 | inert | 500 | 0.5 | inert | 1500 | 0.5 | 32 | 3 | 1.61 |
| 57 | 10 | inert | 500 | 0.5 | inert | 500 | 0.5 | 16 | 0.02 | 2.54 |
| 58 | 10 | inert | 500 | 0.5 | inert | 500 | 0.5 | 32 | 3 | 1.68 |
| 59 | 10 | active | 500 | 0.5 | active | 1500 | 0.5 | 16 | 0.02 | 8.93 |
| 60 | 10 | active | 500 | 0.5 | active | 1500 | 0.5 | 32 | 3 | 8.50 |
| 61 | 10 | active | 500 | 0.5 | active | 500 | 0.5 | 16 | 0.02 | 12.5 |
| 62 | 10 | active | 500 | 0.5 | active | 500 | 0.5 | 32 | 3 | 10.2 |

Porous layers have $\epsilon = 0.32$ and $\tau = 2.2$.

EXAMPLE 5

Effect of Average Pore Radius on Oxygen Flux Obtained with a Membrane Comprising an Active Porous Layer Contiguous with a Dense Layer of Mixed Conducting Oxide This example illustrates the effect of average pore radius on oxygen flux obtained using a membrane having a dense mixed conducting oxide layer which is contiguous with a porous layer of mixed conducting oxide. The results are presented in Table 7 wherein the average pore radius of the porous layer was varied from 0.5 to 15 micrometers using a composite membrane having a dense mixed conducting oxide layer having a thickness of 1000 micrometers and a porous mixed conducting oxide layer having a thickness of 1000 micrometers (odd Runs) or 2000 micrometers (even Runs). The series of odd and even Runs demonstrate that as the average pore radius of the pore layer decreases, the calculated oxygen flux increases. This data demonstrates the criticality of average pore radius on oxygen flux obtained using composite membranes formed from mixed conducting oxides. This effect is neither taught nor suggested by the combined teachings of the prior art.

TABLE 7

EFFECT OF AVERAGE PORE RADIUS ON OXYGEN FLUX OBTAINED WITH A MEMBRANE COMPRISING A DENSE LAYER OF MIXED CONDUCTING OXIDE AND A POROUS LAYER OF MIXED CONDUCTING OXIDE

| RUN NO. | Dense Layer Thickness ($\mu$m) | Porous Layer Thickness ($\mu$m) | Avg. Pore* Radius ($\mu$m) | Calculated $O_2$ Flux (sccm/cm$^2$) |
| --- | --- | --- | --- | --- |
| 63 | 10 | 1000 | 0.5 | 7.18 |
| 64 | 10 | 2000 | 0.5 | 6.21 |
| 65 | 10 | 1000 | 2.0 | 7.42 |
| 66 | 10 | 2000 | 2.0 | 7.09 |
| 67 | 10 | 1000 | 2.5 | 7.30 |
| 68 | 10 | 2000 | 2.5 | 7.05 |
| 69 | 10 | 1000 | 5.0 | 6.75 |
| 70 | 10 | 2000 | 5.0 | 6.66 |
| 71 | 10 | 1000 | 7.5 | 6.36 |
| 72 | 10 | 2000 | 7.5 | 6.32 |
| 73 | 10 | 1000 | 10.0 | 6.07 |
| 74 | 10 | 2000 | 10.0 | 6.05 |
| 75 | 10 | 1000 | 15.0 | 5.67 |
| 76 | 10 | 2000 | 15.0 | 5.66 |

Pfeed = 32 psia; Ppermeate = 3 psia
*Porous layers have $\epsilon = 0.32$ and $\tau = 2.2$ The previously enumerated examples demonstrate that the membranes of the present invention provide superior oxygen flux compared to prior art membranes.

Having thus described the present invention, what is now deemed appropriate for Letters Patent is set forth in the following claims.

EXAMPLE 6

Oxygen Flux Obtained with a Four Layer Composite Membrane

This example illustrates the effectiveness of a four-layer membrane structure comprising a dense mixed conducting oxide layer in between and contiguous with two porous layers of mixed conducting oxide and which porous mixed conducting oxide layer on the permeate side is additionally supported on an inert porous layer. In a preferred case, the porous mixed conducting layers are selected to be thin and have a small average pore radius so as to provide ample gas/solid interfacial area to overcome kinetics limitations. In contrast, the inert porous layer is selected to be relatively thick so as to provide the needed structural integrity and to have relatively large pores so as to minimize pore transport limitations. The results of the computer simulation for this preferred structure are summarized in Table 8. As in Examples 3 and 4, the calculations include pore diffusion resistance due to gases other than oxygen in the feed, in particular the presence of nitrogen in the ratio to oxygen of 4:1 as in air.

Runs 77 and 78 show the flux for the preferred four-layer membrane structure as described above under two different operating conditions. Runs 79 and 80 show the flux for a thin dense mixed conducting oxide layer supported on a thick mixed conducting porous layer with a large average pore radius. For consistency, the total membrane thickness for runs 79 and 80 was selected to be the same as the four-layer structure of runs 77 and 78. A comparison of the results shows that a larger flux can be achieved by using the preferred four-layer membrane as compared to a membrane comprising a dense mixed conducting oxide layer supported on a thick mixed conducting porous layer with large pores.

wherein x is between 0 and 1, y is between 0 and 1 and A is selected from barium, strontium or calcium.

7. The membrane according to claim 4 wherein the dense layer is formed from a multicomponent metallic oxide is selected from the group consisting of $La_{0.2}Ba_{0.8}Co_{0.8}Fe_{0.2}O_{3-x}$, $Pr_{0.2}Ba_{0.8}Co_{0.8}Fe_{0.2}O_{3-x}$ and $La_{0.2}Ba_{0.8}Co_{0.6}Cu_{0.2}Fe_{0.2}O_{3-x}$.

8. A membrane capable of separating oxygen from an oxygen-containing gaseous mixture, which membrane comprises a dense layer having no connected through porosity, which dense layer is contiguous to a porous layer having an average pore radius which increases as a function of distance away from the dense layer, the porous layer and the dense layer which are independently formed from a multicomponent metallic oxide capable of conducting electrons and oxygen ions at a

TABLE 8

| | OXYGEN FLUX OBTAINED WITH A FOUR LAYER COMPOSITE MEMBRANE | | | | | | | | | | | |
|---|---|---|---|---|---|---|---|---|---|---|---|---|
| | Dense Layer | Feed-side Porous Layer* (A) | | | Permeate-side Porous Layer (B) | | | Permeate-side Porous Layer (C) | | | | |
| Run No. | Thickness ($\mu m$) | Type | Thickness ($\mu m$) | Pore Radius ($\mu m$) | Type | Thickness ($\mu m$) | Pore Radius ($\mu m$) | Type | Thickness ($\mu m$) | Pore Radius ($\mu m$) | P(O₂) Feed (psia) | P(O₂) Permeate (psia) | Calculated O₂ Flux (sccm/cm²) |
| 77 | 5 | active | 10 | 0.1 | active | 10 | 0.1 | inert | 1975 | 5 | 3 | 0.015 | 20.81 |
| 78 | 5 | active | 10 | 0.1 | active | 10 | 0.1 | inert | 1975 | 5 | 45 | 16.6 | 11.2 |
| 79 | 5 | None | | | active | 1995 | 15 | None | | | 3 | 0.015 | 7.75 |
| 80 | 5 | None | | | active | 1995 | 15 | None | | | 45 | 16.6 | 2.12 |

*Porous layers have $\epsilon = 0.32$ and $\tau = 2.2$

We claim:

1. A membrane capable of separating oxygen from an oxygen-containing gaseous mixture, which membrane comprises a porous layer having an average pore radius of less than about 10 micrometers and a dense layer having no connected through porosity wherein the porous layer and the dense layer are contiguous and each layer comprises a multicomponent metallic oxide capable of conducting electrons and oxygen ions at a temperature greater than about 500° C.

2. The membrane according to claim 1 wherein the dense layer has a thickness ranging from 0.01 micrometer to about 500 micrometers and the porous layer has a thickness ranging from 1 micrometer to about 2 millimeters.

3. The membrane according to claim 2 wherein the multicomponent metallic oxide demonstrates an oxygen ionic conductivity ranging from 0.01 ohm$^{-1}$cm$^{-1}$ to 100 ohm$^{-1}$cm$^{-1}$ and an electronic conductivity ranging from about 1 ohm$^{-1}$cm$^{-1}$ to 100 ohm$^{-1}$cm$^{-1}$.

4. The membrane according to claim 3 wherein the dense layer and the porous layer are independently formed from one or a mixture of multicomponent metallic oxides represented by the formula $A_xA'_{x'}A''_{x''}B_yB'_{y'}B''_{y''}O_{3-z}$, where A,A',A'' are chosen from the group comprising Groups 1, 2 and 3 and the F block lanthanides; and B,B'B'' are chosen from the D block transition metals according to the Periodic Table of the Elements adopted by the IUPAC wherein $0<x\leq1$, $0<x'\leq1$, $0<x''\leq1$, $0<y\leq1$, $0\leq y'\leq1$, $0\leq y''\leq1$, $x+x'+x''=1$, $y+y'+y''=1$ and z is a number which renders the compound charge neutral.

5. The membrane according to claim 4 wherein A, A' or A'' of the enumerated formula is a Group 2 metal selected from the group consisting of calcium, strontium, barium and magnesium.

6. The membrane according to claim 5 wherein the dense layer is formed from a multicomponent metallic oxide represented by the formula $La_xA_{1-x}Co_yFe_{1-y}O_{3-z}$ temperature greater than about 500° C.

9. The membrane according to claim 8 wherein the dense layer has a thickness ranging from 0.01 micrometer to about 500 micrometers and the porous layer has a thickness ranging from 1 micrometer to about 2 millimeters.

10. The membrane according to claim 8 wherein the multicomponent metallic oxide demonstrates an oxygen ionic conductivity ranging from 0.01 ohm$^{-1}$cm$^{-1}$ to 100 ohm$^{-1}$cm$^{-1}$ and an electronic conductivity ranging from about 1 ohm$^{-1}$cm$^{-1}$ to 100 ohm$^{-1}$cm$^{-1}$.

11. The membrane according to claim 10 wherein the dense layer and the porous layer are independently formed from one or a mixture of multicomponent metallic oxides represented by the formula $A_xA'_{x'}A''_{x''}B_yB'_{y'}B''_{y''}O_{3-z}$, where A,A',A'' are chosen from the group comprising Groups 1, 2 and 3 and the F block lanthanides; and B,B',B'' are chosen from the D block transition metals according to the Periodic Table of the Elements adopted by the IUPAC wherein $0<x\leq1$, $0\leq x'\leq1$, $0\leq x''\leq1$, $0<y\leq1$, $0\leq y'\leq1$, $0\leq y''\leq1$, $x+x'+x''=1$, $y+y'+y''=1$ and z is a number which renders the compound charge neutral.

12. The membrane according to claim 11 wherein A, A' or A'' of the formula is a Group 2 metal selected from the group consisting of calcium, strontium, barium and magnesium.

13. The membrane according to claim 11 wherein the dense layer is formed from a multicomponent metallic oxide represented by the formula $La_xA_{1-x}Co_yFe_{1-y}O_{3-z}$ wherein x is between 0 and 1, y is between 0 and 1 and A is selected from barium, strontium or calcium.

14. The membrane according to claim 11 wherein the dense layer is formed from a multicomponent metallic oxide selected from the group consisting of $La_{0.2}Ba_{0.8}Co_{0.8}Fe_{0.2}O_{3-x}$, $Pr_{0.2}Ba_{0.8}Co_{0.8}Fe_{0.2}O_{3-x}$ and $La_{0.2}Ba_{0.8}Co_{0.6}Cu_{0.2}Fe_{0.2}O_{3-x}$.

15. A membrane capable of separating oxygen from an oxygen-containing gaseous mixture, which membrane comprises a dense layer having no connected through porosity and a plurality of porous layers, each respective porous layer having a discrete average pore radius wherein the average pore radius of each respective porous layer is larger than the average pore radius of the preceding porous layer as function of distance away from the dense layer, the porous layer and the dense layer which are independently formed from a multicomponent metallic oxide capable of conducting electrons and oxygen ions at temperatures greater than about 500° C.

16. The membrane according to claim 15 wherein the dense layer has a thickness ranging from 0.01 micrometer to about 500 micrometers and the porous layer has a thickness ranging from 1 micrometer to about 2 millimeters.

17. The membrane according to claim 16 wherein the multicomponent metallic oxide demonstrates an oxygen ionic conductivity ranging from 0.01 ohm$^{-1}$cm$^{-1}$ to 100 ohm$^{-1}$cm$^{-1}$ and an electronic conductivity ranging from about 1 ohm$^{-1}$cm$^{-1}$ to 100 ohm$^{-1}$cm$^{-1}$.

18. The membrane according to claim 17 wherein the dense layer and the porous layer are independently formed from one or a mixture of multicomponent metallic oxides represented by the formula $A_xA'_{x'}A''_{x''}B_yB'_{y'}B''_{y''}O_{3-z}$, where A,A',A" are chosen from the group comprising Groups 1, 2 and 3 and the F block lanthanides; and B,B',B" are chosen from the D block transition metals according to the Periodic Table of the Elements adopted by the IUPAC wherein $0<x\leq1$, $0\leq x'\leq1$, $0\leq x''\leq1$, $0<y\leq1$, $0\leq y'\leq1$, $0\leq y''\leq1$, $x+x'+x''=1$, $y+y'+y''=1$ and z is a number which renders the compound charge neutral.

19. The membrane according to claim 18 wherein A, A' or A" of the formula is a Group 2 metal selected from the group consisting of calcium, strontium, barium and magnesium.

20. The membrane according to claim 18 wherein the dense layer is formed from a multicomponent metallic oxide represented by the formula $La_xA_{1-x}Co_yFe_{1-y}O_{3-z}$ wherein x is between 0 and 1, y is between 0 and 1 and A is selected from barium, strontium or calcium.

21. The membrane according to claim 18 wherein the dense layer is formed from a multicomponent metallic oxide is selected from the group consisting of $La_{0.2}Ba_{0.8}Co_{0.8}Fe_{0.2}O_{3-x}$, $Pr_{0.2}Ba_{0.8}Co_{0.8}Fe_{0.2}O_{3-x}$ and $La_{0.2}Ba_{0.8}Co_{0.6}Cu_{0.2}Fe_{02}O_{3-x}$.

22. A membrane capable of separating oxygen from an oxygen-containing gaseous mixture, which membrane comprises a first porous layer formed from a multicomponent metallic oxide having an average pore radius of less than about 10 micrometers which is deposed to a second porous layer which is not a mixed conducting oxide, the first porous layer being contiguous with a dense layer having no connected through porosity comprising a multicomponent metallic oxide capable of conducting oxygen ions at temperatures greater than about 500° C.

23. The membrane according to claim 22 wherein the porous layer which is not a mixed conducting oxide is formed from a material selected from the group consisting of alumina, silica, magnesia, titania, a high temperature oxygen compatible metal alloy, a metal stabilized zirconia and compounds and mixtures thereof.

24. The membrane according to claim 22 wherein the dense layer has a thickness ranging from 0.01 micrometer to about 500 micrometers.

25. The membrane according to claim 24 wherein the dense layer is formed from a multicomponent metallic oxide demonstrates an oxygen ionic conductivity ranging from 0.01 ohm$^{-1}$cm$^{-1}$ to 100 ohm$^{-1}$cm$^{-1}$ and an electronic conductivity ranging from about 1 ohm$^{-1}$cm$^{-1}$ to 100 ohm$^{-1}$cm$^{-1}$.

26. The membrane according to claim 25 wherein the dense layer and the first porous layer are independently formed from one or a mixture of multicomponent metallic oxides represented by the formula $A_xA'_{x'}A''_{x''}B_yB'_{y'}B''_{y''}O_{3-z}$, where A,A',A" are chosen from the group comprising Groups 1, 2 and 3 and the F block lanthanides; and B,B',B" are chosen from the D block transition metals according to the Periodic Table of the Elements adopted by the IUPAC wherein $0<x\leq1$, $0\leq x'\leq1$, $0\leq x''\leq1$, $0<y\leq1$, $0\leq y'\leq1$, $0\leq y''\leq1$, $x+x'+x''=1$, $y+y'+y''=1$ and z is a number which renders the compound charge neutral.

27. The membrane according to claim 25 wherein A, A' or A" of the formula is a Group 2 metal selected from the group consisting of calcium, strontium, barium and magnesium.

28. The membrane according to claim 25 wherein the dense layer and the first porous layer are independently formed from a multicomponent metallic oxide represented by the formula $La_xA_{1-x}Co_yFe_{1-y}O_{3-z}$ wherein x is between 0 and 1, y is between 0 and 1 and A is selected from barium, strontium or calcium.

29. The membrane according to claim 25 wherein the dense layer and the first porous layer are independently formed from a multicomponent metallic oxide selected from the group consisting of $La_{0.2}Ba_{0.8}Co_{0.8}Fe_{0.2}O_{3-x}$, $Pr_{0.2}Ba_{0.8}Fe_{0.2}O_{3-x}$ and $La_{0.2}Ba_{0.8}Co_{0.6}Cu_{0.2}Fe_{0.2}O_{3-x}$.

30. A membrane capable of separating oxygen from an oxygen-containing gaseous mixture, which membrane comprises a first porous layer and a second porous layer which are separated by and contiguous with a dense layer having no connected through porosity wherein the first porous layer, the second porous layer and the dense layer are independently formed from a multicomponent metallic oxide capable of conducting electrons and oxygen ions at temperatures greater than about 500° C.

31. The membrane according to claim 30 wherein the dense layer has a thickness ranging from 0.01 micrometer to about 500 micrometers and the porous layer has a thickness ranging from 1 micrometer to about 2 millimeters.

32. The membrane according to claim 31 wherein the multicomponent metallic oxide demonstrates an oxygen ionic conductivity ranging from 0.01 ohm$^{-1}$cm$^{-1}$ to 100 ohm$^{-1}$cm$^{-1}$ and an electronic conductivity ranging from about 1 ohm$^{-1}$cm$^{-1}$ to 100 ohm$^{-1}$cm$^{-1}$.

33. The membrane according to claim 32 wherein the dense layer and the first and second porous layers are independently formed from one or a mixture of multicomponent metallic oxides represented by the formula $A_xA'_{x'}A''_{x''}B_yB'_{y'}B''_{y''}O_{3-z}$, where A,A',A" are chosen from the group comprising Groups 1, 2 and 3 and the F block lanthanides; and B,B',B" are chosen from the D block transition metals according to the Periodic Table of the Elements adopted by the IUPAC wherein $0<x\leq1$, $0\leq x'\leq1$, $0\leq x''\leq1$, $0<y\leq1$, $0\leq y'\leq1$, $0\leq y''\leq1$, $x+x'+x''=1$, $y+y'+y''=1$ and z is a number which renders the compound charge neutral.

34. The membrane according to claim 33 wherein A, A' or A" of the formula is a Group 2 metal selected from the group consisting of calcium, strontium, barium and magnesium.

35. The membrane according to claim 33 wherein the dense layer is formed from a multicomponent metallic oxide represented by the formula $La_xA_{1-x}Co_yFe_{1-y}O_{3-z}$ wherein x is between 0 and 1, y is between 0 and 1 and A is selected from barium, strontium or calcium.

36. The membrane according to claim 33 wherein the dense layer is formed from a multicomponent metallic oxide is selected from the group consisting of $La_{0.2}Ba_{0.8}Co_{0.8}Fe_{0.2}O_{3-x}$, $Pr_{0.2}Ba_{0.8}Co_{0.8}Fe_{0.2}O_{3-x}$ and $La_{0.2}Ba_{0.8}Co_{0.6}Cu_{0.2}Fe_{0.2}O_{3-x}$.

* * * * *

UNITED STATES PATENT AND TRADEMARK OFFICE
CERTIFICATE OF CORRECTION

PATENT NO. : 5,240,480
DATED : August 31, 1993
INVENTOR(S) : Thorogood, et al.

Page 1 of 1

It is certified that error appears in the above-identified patent and that said Letters Patent is hereby corrected as shown below:

<u>Column 23,</u>
Line 59, delete "$0<x'\leq 1, 0<x''\leq 1,$" and substitute therfor -- $0\leq x'\leq 1, 0\leq x''\leq 1,$ --

Signed and Sealed this

Twenty-fifth Day of September, 2001

Attest:

NICHOLAS P. GODICI
*Attesting Officer*   *Acting Director of the United States Patent and Trademark Office*